United States Patent
Brod

(10) Patent No.: US 12,433,258 B2
(45) Date of Patent: Oct. 7, 2025

(54) SYSTEM AND METHOD FOR LIGHT TREATMENT OF POLLINATING INSECTS

(71) Applicant: Beefutures Holding AS, Oslo (NO)

(72) Inventor: Christophe Philippe Brod, Oslo (NO)

(73) Assignee: Beefutures Holding AS, Oslo (NO)

( * ) Notice: Subject to any disclaimer, the term of this patent is extended or adjusted under 35 U.S.C. 154(b) by 64 days.

(21) Appl. No.: 18/566,591

(22) PCT Filed: Jun. 3, 2022

(86) PCT No.: PCT/NO2022/050125
§ 371 (c)(1),
(2) Date: Dec. 1, 2023

(87) PCT Pub. No.: WO2022/255882
PCT Pub. Date: Dec. 8, 2022

(65) Prior Publication Data
US 2024/0251761 A1  Aug. 1, 2024

(30) Foreign Application Priority Data

Jun. 4, 2021 (NO) .................................. 20210708

(51) Int. Cl.
*A01K 47/06* (2006.01)
*A01K 51/00* (2006.01)

(52) U.S. Cl.
CPC .............. *A01K 47/06* (2013.01); *A01K 51/00* (2013.01)

(58) Field of Classification Search
CPC ........ A01K 51/00; A01K 47/00; A01K 47/06; A01K 67/366; A01K 67/34
USPC ...................................................... 449/2, 3
See application file for complete search history.

(56) References Cited

U.S. PATENT DOCUMENTS

| | | | | |
|---|---|---|---|---|
| 1,490,126 | A * | 4/1924 | Penney | ................... A01K 47/00 449/38 |
| 2014/0134920 | A1 | 5/2014 | Linhart | |
| 2017/0079249 | A1 | 3/2017 | Chapa | |
| 2018/0236021 | A1 * | 8/2018 | Del Vecchio | ........ A23K 20/163 |
| 2018/0338476 | A1 * | 11/2018 | Richardson | ............ A01K 51/00 |
| 2020/0315143 | A1 | 10/2020 | Radzyner et al. | |
| 2020/0323177 | A1 * | 10/2020 | Drennan | .............. A01K 1/0047 |

FOREIGN PATENT DOCUMENTS

| | | | |
|---|---|---|---|
| CN | 107810885 A | | 3/2018 |
| EP | 3041349 B1 | | 7/2016 |
| WO | WO 2018/165051 A1 | | 9/2018 |
| WO | WO 2020/117813 A1 | | 6/2020 |
| WO | WO 2021/112689 A1 | | 6/2021 |

OTHER PUBLICATIONS

Norwegian Search Report for Patent Application No. 20210708, dated Jun. 16, 2021.
International Search Report for PCT/NO2022/050125, dated Jul. 29, 2022.
Powner et al., "Improving Mitochondrial Function Protects Bumblebees from Neonicotinoid Pesticides." (2016).

* cited by examiner

*Primary Examiner* — Zoe Tam Tran
(74) *Attorney, Agent, or Firm* — Knobbe, Martens, Olson & Bear, LLP

(57) ABSTRACT

A system and method for light treatment of pollinating insects including a hive structure including at least one hive compartment box including multiple frames spaced apart inside the at least one hive compartment box and at least one light device.

21 Claims, 6 Drawing Sheets

SYSTEM AND METHOD FOR LIGHT TREATMENT OF POLLINATING INSECTS

CROSS-REFERENCE TO RELATED APPLICATIONS

The present application claims the priority of Norwegian application No. NO20210708, filed Jun. 4, 2021, and international application No. PCT/NO2022/050125, filed Jun. 3, 2022, the disclosures of which are hereby incorporated by reference in their entireties.

FIELD OF THE INVENTION

The present invention relates to system and method for light treatment of pollinating insects. More specifically it relates to a hive structure comprising a light therapy device.

BACKGROUND OF THE INVENTION

The number of bees in the world is dropping dramatically each year and estimates show that up to a third of Europe's bee population and a fourth of Europe's bumble bee population are endangered. Given that bees pollinate around one-third of food crops and 90 percent of wild plants, the consequences of this ecological disaster are alarming for biodiversity, the food chain and, not least, our ability to feed ourselves. The bee's pollination contributes to up to 30% of the world's fruit and vegetable production and animal feed for grazing animals. A reduction in bee population is thus a sharp reduction in food production.

The cause for this is likely linked to an un-unprecedented sum of challenges. While some of the threats are individually fatal for bees, it is surely the cocktail of multiple stressing and pressing factors which is causing their dramatic downfall, among them is the colony collapse disorder (CCD).

The CCD occurs when a majority of worker bees in a colony simply disappear—due, scientists believe, to the use of a new class of pesticides, neonicotinoids. Neonicotinoids are a class of neuro-active insecticides chemically similar to nicotine. They are active substances used in plant protection products to control harmful insects, which means they are insecticides. Among other things, neonicotinoids increase bees' susceptibility to the deadly varroa mite, their number one killer.

Studies have shown that a combination of neonicotinoids exposure, pollution, lack of food, decrease of biodiversity and biological variation in farmed areas, climate change and the increase of hostile enemies such as the parasitic mite *Varroa destructor* and the Asian giant hornet *Vespa mandarinia* are all contributing to the bees decline in population.

Recent founds show that when bees cat a low sugar diet, which is typically the case in winter or in intensive low biodiversity agriculture areas, the bees are 50 percent more likely to die as a result of neonicotinoid exposure. And it is this cocktail of hostile environments that seems to cause the bees to become weaker from neonicotinoids together with an energy poor diet, causing them to not have the necessary energy to travel the necessary distances to gather food, loosing even more energy and finally being killed in large numbers by enemies or dying from exhaustion.

The research article "Improving Mitochondrial Function Protects Bumblebees from Neonicotinoid Pesticides" by Powner et al. published in 2016 has shown that exposing bumblebees (*Bombus terrestris audax*) with near infrared light with a wavelength of 670 nm may increase their mitochondrial production of adenosine triphosphate (ATP). Corrected ATP levels in individuals exposed to insecticides such as neonicotinoids showed significant improvements in mobility allowing them to feed. The article teaches that deep red-light exposure improves mitochondrial function, reverses the sensory and motor deficits induced by neonicotinoid. The test was carried out by placing the bees in a transparent plastic container and exposing the bumblebees to light. The article estimates that the true impact of this deep red light is likely much greater than revealed in the ATP and Metabolic functions tests.

The drawbacks of the known methods that it is impossible to treat or heal bees in the wild and the optimum exposure required in a hive is not known, which could result in causing harm and more damaged to a population if wrongly executed (measured and documented by the applicant). It is also believed that the method did not control for, or the test was not aimed at, all the benefits of light exposure.

These benefits are increased mobility, improved immunity, reduced oxidation at cellular level, improved retinal function and memory of the bees, and improved respiration as well as a result of mitochondrial function improvement. Test carried out has also demonstrated increased metabolic metrics improvement for bee colonies exposed to other stress factors such as Asian Hornet, Varroa mite and dearth period.

The patent application WO 2018/165051 A1 teaches a translucent hive for treating honey bee colonies against destructive insect such as Varroa. The translucent hive has at least one outer wall transparent to light from the outside. In another embodiment disclosed in WO 2018/165051 A1 an illuminator board 1900 is placed under a translucent wall in the bottom of the hive. The teachings of WO 2018/165051 A1 has the drawbacks of hindering the natural flow of bees as the bottom board stop bees from entering and exiting the compartment from the bottom. Further drawback of the known prior art is the poor illumination of the bees and the lack of control of over or under exposure. Document CN 107810885 A discloses a bee observation device includes a bottom plate 1, a frame 2 is fixed on the outer surface of the upper end of the bottom plate. The outer surface of the upper end of the bottom plate 1 is provided with a positioning groove 9, a first groove 10 and a second groove. 12. A light emitting diode 11 is fixedly mounted on the inner surface of the first groove 10, see paragraphs 26 and 27 and example 1. Document US 2018/0338476 A1 discloses a hive box 12 with a brood boxes 20, top cover 40, bottom floor 22 and frames 24. The top cover 40 is translucent but is colored red such that only red light is transmitted into the hive box 12 when light is transmitted through the top wall 42 and into the hive box 12.

The light therapy exposure, light coverage and the wavelength configuration are critical to ensure maximum biological response.

It is an aim of the present invention to treat pollinating insects in the wild and further increase energy levels due to lack of food, old age and other diseases together with improved metabolism and motivation and energy to fight parasites and predators. It is further an aim of the present invention to correctly expose pollinating insects ensure maximum biological response and avoid damaging by incorrect treatment. Timing of the exposure is also critical and season depending, the solution ensures optimal biological response by adapting exposure time and duration depending on the time of the year and the bee colony activity level.

SUMMARY OF THE INVENTION

The invention is set forth and characterized in the main claims, while the dependent claims describe other characteristics of the invention.

DETAILED DESCRIPTION OF THE INVENTION

Figure 1:
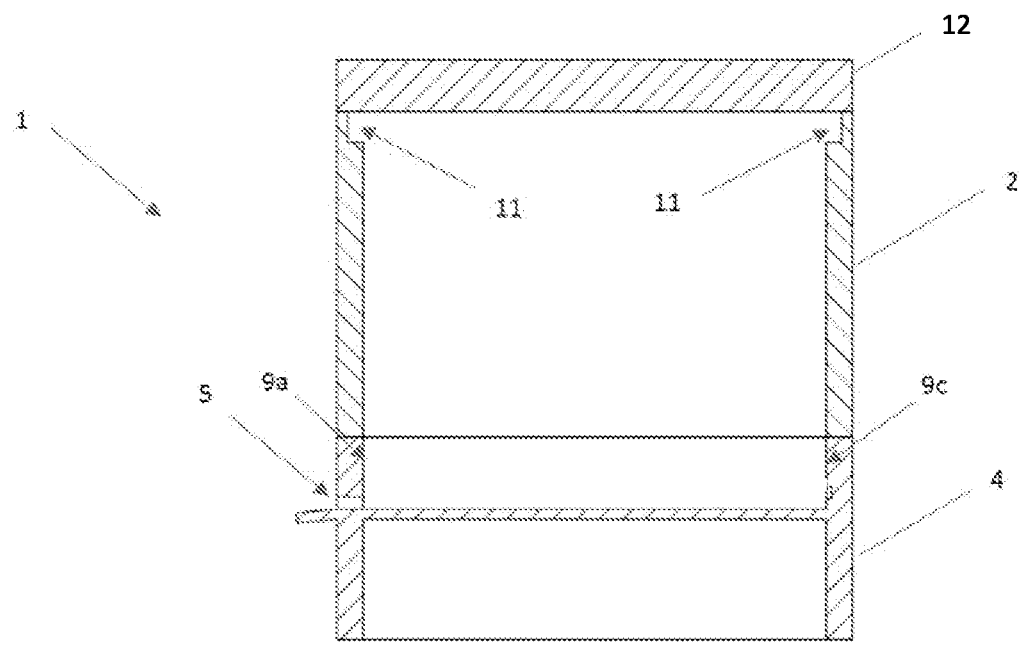
FIG. 1 shows a side view of a hive

The following description will use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting. It should be understood that the terms pollinating insects or insect pollinators is used for bees, honey bees, bumblebees, osmia bees and other insects cultivated and managed by humans in hives. And the use of either bee or honey bee is for the reader's convenience only and shall not be limiting. A hive is any man-made structure or artificial nest used to cultivated and managed pollinating insects.

Figure 2:
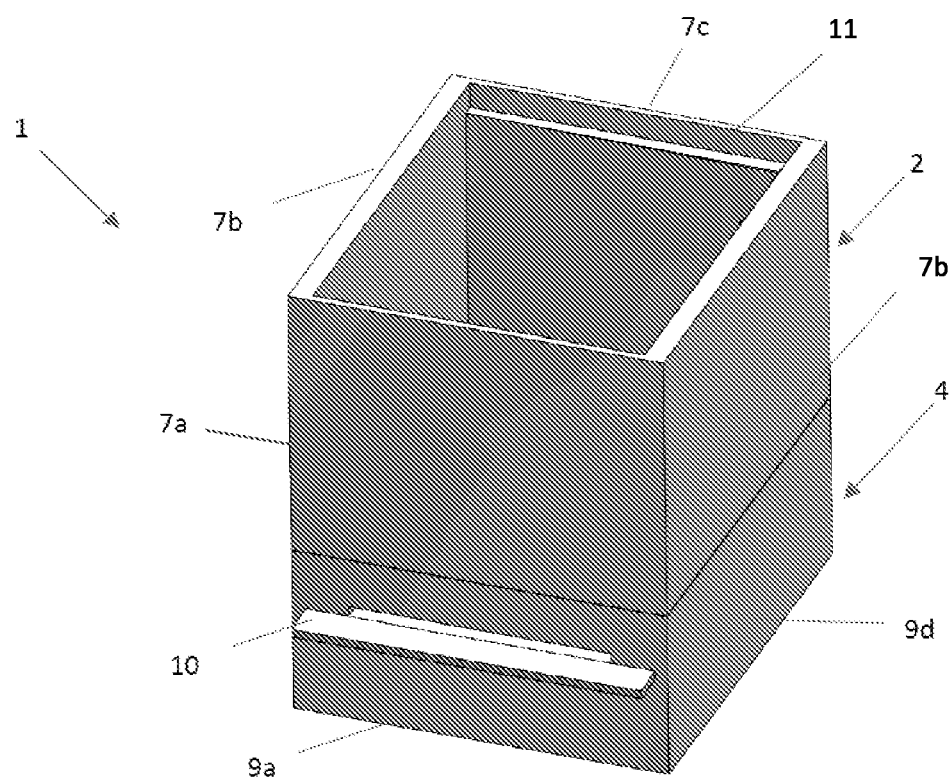
FIG. 2 shows a hive in slanted front view without the top cover

A typical hive, as illustrated in FIGS. 1 and 2, is typically an artificial nest or structure made to house and keep a colony of pollinating insects such as honey bees, bumblebees, or other insects, for the purpose of producing and harvesting honey, pollinating crops or raise and house bees for other purposes.

Typically, a vertical hive bee hive structure comprises at least one hive compartment box for the queen to lay egg and at least one hive compartment box positioned on top of the first box to store honey. These boxes are sometimes known as brood box and honey super box, respectively. Typical for these hive compartment boxes is that they comprise four upright quadrilateral wall plates in a quadrilateral lay out in a manner forming a four-sided box open in the top and bottom. Inside the box a number of vertical frames are typically hanging or fastened from the top edge portion of two opposing walls. The frames have a height corresponding to, or less than, the height of the wall plates, and a width corresponding to less than the internal width of the box.

The frames are used for holding an storing hexagonal prismatic cells made of honeycomb. The bees use the cells to store honey and pollen in the honey super box, and to house the eggs, larvae, and pupae in the brood box.

In a typical hive there may be between 5-12 frames inside the brood or honey super box each, however any number of frames may be used, which would be obvious to a person skilled in the art. Furthermore, multiple hive compartment boxes may be stacked on top of each other, either with a separating part, such as a queen excluder or other functional separator in between the boxes, or in direct contact. In situations where the production and storage of honey is not the objective, or any other reason for a beekeeper to not store honey, a hive can exist with only one hive compartment box, i.e. no honey super box. The size and dimensions of the hive may vary according to the type of hive used. Hives may typically be constructed from wood, closed-cell extruded polystyrene foam (XPS) or other types of suitable materials such as plastic.

There exist a large variety of different hives, wherein there is two main categories; vertical hooves or horizontal hives. The most typical types of hives honey bees are Langstroth hive, Dadant hive, Warré hive, WBC hives, CDB hives, Perone hives, Norwegian standard hive, UK standard hive and German standard hive. In patent EP 3041349 B1 a list of hives and measurements for the hives are listed in Table 1. All of these hives may be used in a system in accordance with the embodiments of the invention defined in the claims.

Hives adapted for Osmia bees, mason bees and bumblebees are often of simpler construction than hives adapted for honeybees. Bumblebee hives does not have frames and may comprise of only one hive compartment box and an entrance and exit, and Osmia beehives comprises multiple holes or tunnels in an otherwise solid construction. It should be understood that the light therapy device in accordance with the disclosure herein may also be used on hives for bumblebee hives and Osmia beehives.

Furthermore, a hive structure may comprise an entrance chamber box positioned on the bottom of the stack. The entrance chamber box may be a bottom board comprising separate entrance chamber positioned below the at least one hive compartment box and/or traps and screens for entrance control.

On top of the hive, a cover is used as a roof. Typical covers may be a telescopic cover or a migratory cover that's seals the top hive compartment box from rain, cold or heat.

It should be obvious to a person skilled in the art that any combination of number of boxes, compartments, functional disclosures, types and sizes of hives for pollinating insects and honeybees may be suitable for the present inventions disclosed herein.

Light Therapy Device

The light therapy device comprises at least one light unit, wherein the at least one light unit may be positions in different compartments or boxes of the hive. The at least one light unit comprises at least one light emitting diode (LED). And in an embodiment of the invention, the light units comprise multiple LEDs configured in a strip arrangement. This strip arrangement of LEDs may be housed in a transparent protective material to protect the LEDs from honey, pollen, wax, comb or bees.

In an embodiment of the invention one light unit may be positioned in a hive compartment box comprising internal frames, such as a brood box, and one light unit may be positioned in the bottom board part of the hive. In said example, the light therapy device comprises two light units, wherein each light unit may be comprised of several LED strips or several single LEDs.

In another embodiment of the invention the light therapy system may further comprise a light unit positioned in a top module 12, wherein the top module may be any suitable top covering device positioned on top of the hive stack, this includes traditional covers modified with light units or purpose build top modules.

The LEDs are electronically connected via wire or embedded wiring. The at least one light unit is powered by a power source. The power source may be an external power source in the form of power mains or the like, one or multiple batteries, renewable power sources such as a solar panel, wind generator or a combination of said sources.

Bees exposed to light at 670 nm has been shown to fully recover their mitochondria functions and ATP production, thus reversing the sensory and motor deficits induced by Neonicotinoid. Studies have also shown recovery of the immune response to bacterial tests. The spectrum of light with a wavelength of between 620-1000 nm has also shown effects of restoring the metabolic function of bees that have been poisoned by pesticides. The lights unit(s) comprised in the system according to the present invention emits light with a beneficial wavelength, wherein the beneficial wavelength is preferably between 620-1000 nm. However, in situations where it would be beneficial for a human to visually control if the light therapy device was turned on or off, it is necessary to keep the light in the visual human spectrum. The visual light spectrum for humans is considered to be from 380 to 740 nm, thus rendering humans unable to see light above 740 nm. Therefore, the beneficial wavelength in accordance with the intentioned is more preferably between 640-700 nm, and even more preferably between 660-680 nm.

The bees have different levels of activity during a year, and the times for when pesticides are used on a crop is also dependent on the time of the year. Therefore, in an embodiment of the invention, the system further comprises a control unit for selectable switching the light therapy device on or off, to maximize biological response to the light therapy. Crucially, the control unit controls when the light therapy device is turned on or off, and for how long the duration of the on- or of-periods should be, and the number of cycles in a predetermined time the on- or off-periods should last. The control unit may be configurable to control parameters for predetermined light intervals, wherein said parameters is at least on of; the light exposure duration, the duration of the off-time, the frequency of the intervals.

In an embodiment of the invention the control unit for selectable switching the light therapy device on or off is remotely configurable via a remote control. The remote-control system may be comprised of either a wired or wireless transmitting and receiving means.

The light therapy device will, in an embodiment of the invention, emit infrared or close to infrared light with a wavelength of preferably between 620-1000 nm, and more preferably between 640-700 nm, and even more preferably between 660-680 nm. The LED as comprised in the light unit, should preferably be capable of emitting light where at least 68.26% of the light emitted has wavelength of between 660-680 nm or more preferably at least 95.44% of the light emitted has a wavelength of 660-680 nm. Alternatively, the peak wavelength 12 should be around 670 nm in a spectral power distribution. A spectral power distribution refers to the concentration of wavelength of radiometric or photometric quantity, and in this case, the peak wavelength of a spectral power distribution should be understood as the wavelength with the highest power per unit area per unit wavelength of an illumination.

In an embodiment of the invention the light therapy device is activated and deactivated i.e. the light unit is turned on or off, by the signal from at least one sensor. The effect of this is that the healing and therapeutic effect function is automatically triggered when needed or when external influences renders light treatment most efficient and needed. To achieve this effect, a control unit, adapted to control the power to, and thereby the on/off-functionality of, the light unit, might be triggered by receiving signals or measurements on abnormal bee colony metrics. These abnormal bee colony metrics can be—$CO_2$ values, where for instance high $CO_2$ value relative to colony size could indicate degraded respiration ability of the bees and poorer metabolic rate and declining immunity,—abnormal colony size decline and/or—detection of pesticides.

These signals or metrics that may indicate abnormal bee colony metrics may measurements using at least one sensor. To measure the $CO_2$ value a $CO_2$ sensor and/or oxygen sensor is used. To measure the size of the colony and the rate of change in the colony, a counting device such as a camera counting and registering bees in and out of at least one entrance is use. A weight measuring device might be used, either on its own or as an addition to the camera counting device, used to monitor the weight of the hive or parts of the hive thereof, and thereby the colony, and whereby a sudden or abrupt decrease in weight measured will indicate that bees are leaving the hive in large numbers. Said counting sensors also capable of registering a sudden bee drift, i.e. non-returning bees from foraging, which is a is a clear sign of poisoning. Said bee drift is detected and measured by counting leaving and entering bees with a camera and video-based sensor device coupled, by at least signal transfer means and/or electrical transfer means, to a computer device. Whereby the computer device is running an image reconditioning software capable of detecting and counting bees. Alternatively, or in addition to said visual sensor, an electronic bee counter gate which registers bees in and out through the gate might be used.

The effect of the automatically controlled control of the light therapy device is both to expose the bees to light at optimal times, and to reduce exposer when it might not be beneficial. At times, it might not be optimal to ensure the longevity of old bees by way of the present invention, but rather promote the queen bee to lay eggs. For instance, if a bee colony is not particularly stressed or there is no particular sign of decline, the light therapy device will facilitate to keep old bees alive longer than normal and cause the colony to be too large at a peak point. The queen may regulate the situation by stopping laying eggs or bees themselves might trigger a swarm because of storage and space lack in a hive. In other words, if there is no sign of colony decline it might not be desirable to treat the bees with light as it could trigger abnormal colony evolution and negative side effects. To ensure that the correct timing of light exposure, the light therapy device may comprise a control device which receives input from at least one sensor, as described above.

DETAILED DESCRIPTION OF THE DRAWINGS

FIG. 1 illustrates a side view typical hive structure 1 with a top module or cover 12, a hive compartment box 2 beneath the top cover 12, wherein the hive compartment box 2 has opposing top shelf like grooves 11 for the placement of vertically hung frames 3. The hive compartment box 2 is located on top of the entrance chamber box 4 comprising the entrance 5 for the bees to enter and exit the hive compartment box 2 via the entrance chamber box 4. The side walls 9b, 9b (shown in FIG. 2) are the two walls perpendicular to the walls 9a comprising the entrance 5 and the wall 9c opposite the entrance. Other entrances may be positioned on top or in other locations.

Figure 5:
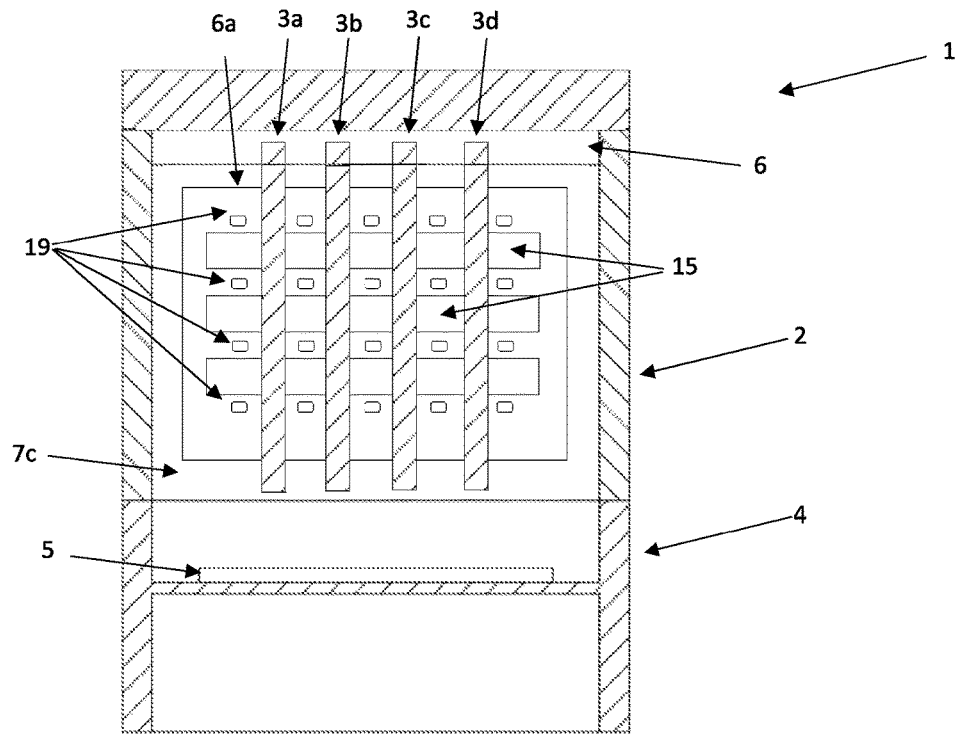
FIG. 5 shows the light unit attached to the internal of a hive with frames.

In FIG. 2 a typical hive structure 1 is shown from a slanted front view in 3D. The forward-facing portion comprises the bee entrance 5 to the hive structure 1 and the entrance landing board 10 for bees to take off from and land before entering or exiting the hive 1. In FIG. 5 the hive compartment box 2 is illustrated with four upright quadrilateral wall plates 7a, 7b, 7c. 7d in a quadrilateral lay out in a manner forming a four-sided box open in the top and bottom.

Figure 3:
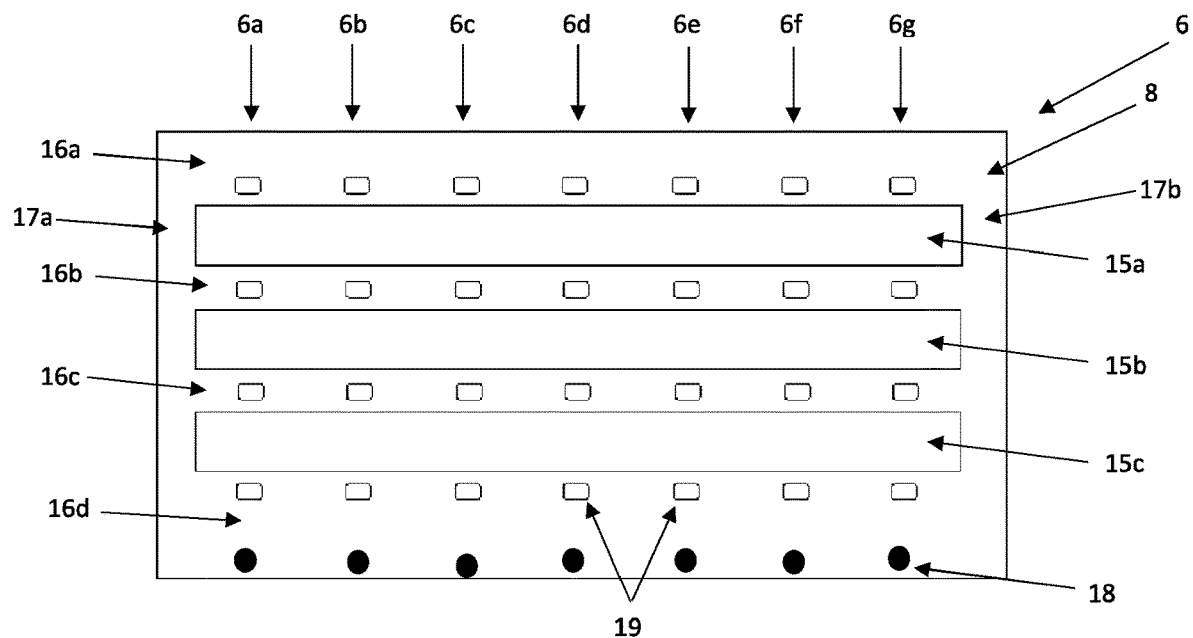
FIG. 3 shows the light unit

FIG. 3 illustrates a front view of a light unit 6 on its own. The light unit 6 in the figure comprises a base member 8 and multiple light emitting diodes 19, LED's, arranged seven vertical columns 6a-6g. The arrangement of LED's 19 may be vertical columns, horizontal columns or a grid. Whereas the light unit 6 according to an embodiment of the invention may comprise two or more vertical columns of LED's. The base member 8 comprises at least an opening 15, and in FIG. 3 the base member is illustrated with three opening 15a, 15b and 15c, wherein said openings 15 has a larger extent in the horizontal direction than they have in the vertical direction. Said opening 15 must be at least the width of a frame 3 and may extend across up to the internal width of the hive compartment box. Said opening(s) 15 being comprised of an open area void of material and being adapted for bees to enter from one side of a frame 3 to another side of the same frame 3 through said open area of the base member 8. Said open area or opening 15 may be a cut out section in an otherwise a solid plate that may make up the base member 8. The base member 8 comprises at least two longitudinal structural members 16, wherein the longitudinal members are spaced apart a predetermined distance. In FIG. 3 an embodiment of the invention comprising four longitudinal structural members 16a, 16b, 16c, 16d is illustrated. The space between the two neighboring longitudinal members 16 forms the open area or the opening 15 adapted for bees to enter from one side of a frame 3 to another side of the same frame 3 through said open area of the base member 8, The columns of LED's is attached to the longitudinal members 16 and passes over or intersects the openings 15. Furthermore, the base member comprises at least two structural end members 17, wherein the at least two structural end members are respectively attached to a first side and a second side of the at least two longitudinal members 15. In FIG. 3, a first vertically positioned end member 17a is connected to the first ends of the four longitudinal structural members 16a, 16b, 16c, 16d and a second end member 17b is connected to the second ends of the four horizontally orientated longitudinal structural members 16a, 16b, 16c, 16d. The base member 8 has an extent in both the vertical and horizontal plane which may be understood as the height and width of the base member 8. In addition, the base member 8 has a thickness or depth which is substantially thinner than the height or width, thereby the base member 8 may have a typical plate-shape. The thickness or depth of the base member 8 is adapted to be less than, or equal to, the gap W (illustrated in FIG. 6) between an end of an frame 3 and the inner wall of the hive. The opening(s) 15 in the base member 8 may thusly be a cut out portion of said plate-shape creating at least a throughgoing hole when the base member is free i.e. not attached to anything. Said opening(s) 15 in the base member 8, whereby the base member is attached to a wall, will be seen and experiences as a hollow, depression, pit or sunken area in the surface of the base member 8, wherein the wall behind will be the bottom of said hollow, depression, pit or sunken area. If an end of a frame 3 is flush with the base member 8, the bees may enter the opening 15 and transverse to another side of the same frame 3 and exit the opening 15 on the same surface side of the base member 8 as they entered, but on another side of said frame 3. Said opening(s) will thusly function as a passage passed the frame 3.

Figure 4:
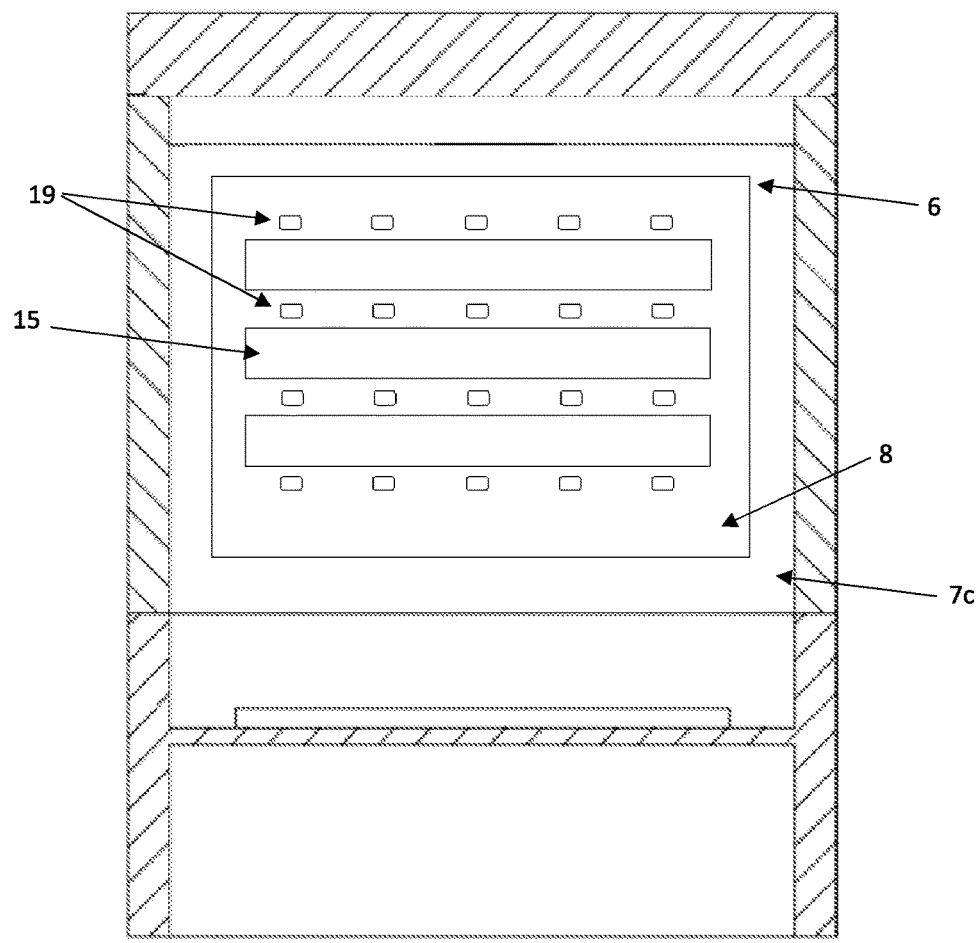
FIG. 4 shows the light unit attached to the internal of a hive.

FIG. 4 illustrates a frontal view of a hive with the front wall 7a of the hive compartment box 2 removed to show a light unit 6 attached to the back wall 7c and with the vertical columns of LED's 19 facing the internal space of the hive compartment box 2. The light unit 6 when turned on, emits light with a predetermined wavelength on the inside of said hive compartment box, whereby the light unit 6 is positioned inside of the at least one hive compartment box 2. In FIG. 4 the frames 3 are not shown to illustrate the placement of the light unit 6.

FIG. 5 illustrates a frontal view of a hive with the front wall 7a of the hive compartment box 2 removed to show a light unit 6 attached to the back wall 7c and with four frames 3a, 3b, 3c, 3d hung inside the hive compartment box 2. The frames are hung from opposite protruding notches on each end of a frame 3 that corresponds with the opposing groves 11 on the front and back wall 7a, 7c of the hive compartment box 2. FIG. 5 illustrates the system in accordance with an embodiment of the invention for light treatment of pollinating insects, wherein the a hive structure 1 comprising at least one hive compartment box 2 comprising at least one 3 but more preferably multiple frames 3a-3d spaced apart a predetermined distance inside the at least one hive compartment box 2. An entrance chamber box 4 is positioned below the at least one hive compartment box 2 in contact with said hive compartment box 2. The entrance chamber box 4 comprises an entrance 5 for pollinating insects to enter and exit the hive structure. The entrance may be an opening or hole in the entrance chamber box 4. The at least one light unit, when turned on, emits light with a predetermined wavelength, wherein the predetermined wavelength is preferably between 620-1000 nm, and more preferably between 640-700 nm, and even more preferably between 660-680 nm. The one light unit 6 is positioned and fastened, either by releasable fastening means or permanents fastening men's, inside of the hive compartment box 2. The light unit 6 is comprising a base member 8, wherein said base member 8 is attached, such as fastened or realizably fastened or fastened by other known means to one of the side walls 7 of said hive compartment box 2 between the end of the frames and side wall 7.

The five vertical columns of LED's 6a-6e in FIG. 5 are attached to the base member 8 on a side of the base member facing the space and frames inside of the hive compartment box 2, said five vertical columns of LED's 6a-6e are spaced apart a predetermined distance corresponding to the distance of two adjacent frames. The vertical columns of LED 6a-6e are situated between the frames 3a-3e, thereby each respective vertical columns of LED 6a-6e are facing the space between two adjacent frames 3 or the space between a frame and a wall 7, thereby illuminating, when turned on, the open space in front of the vertical columns of LED 6a-6e the faces of the frames 3 and any bees that might be in the view of the light. In FIG. 5 the height from the lowest positioned LED to the highest positioned LED in a column is lower than the height of a frame 3. The vertical extent from the lowest positioned LED to the highest positioned LED in a vertical column i.e. the vertical extent of a columns of LED' may be at least half the height of the frames 3.

Figure 6:
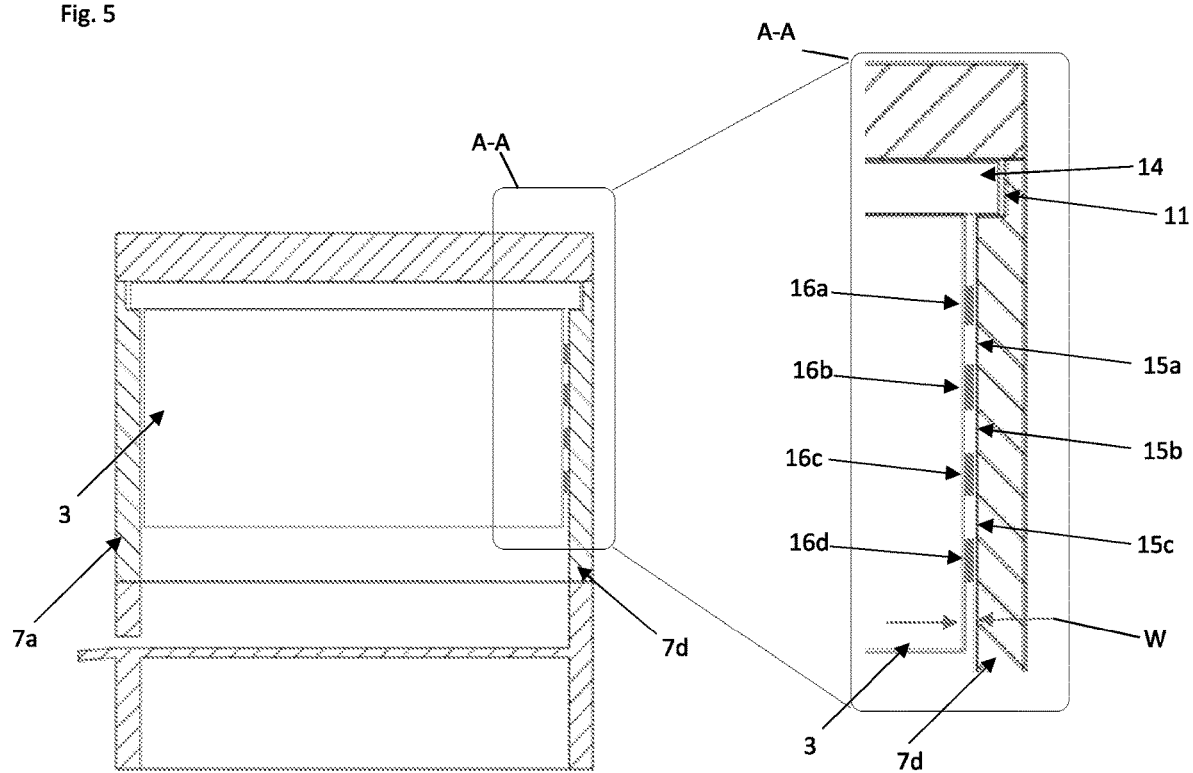
FIG. 6 shows the light unit attached to the internal of a hive with the openings enlarged

FIG. 6 illustrates a cross-section straight thought a hive structure wherein the cross-section plane is a horizontal plane cutting through the front wall 7a with the entrance 5, the back wall 7c and an enlarged section A-A. The figure also shows a cross section of a frame 3 that is hung or suspended from opposite protruding frame notches 14 that rest in the opposing groves 11 of the respective opposing walls of hive structure 1 seen from the side. In a traditional hive, bees are free to move from one side of a frame 3 and to the other side of the same frame 3 by way of a slit or opening between the wall and the end of the frame 3, as can be seen to the left in FIG. 6, between the wall 7a and the frame 3. To continue to allow bees to move unhindered inside the chamber box 2 when a light unit is attached to the wall between said wall and the end of said frame 3, the base member 8 of the light unit 6 comprises at least an opening 15. In FIG. 6 three openings a first 15a, a second 15b and a third opening 15c is shown. The openings 15 are defined by the void between two adjacent longitudinal structural members 16, and the void W between the frame 3 and wall 7d. The innovation may comprise one or more openings 15 based on the number of longitudinal structural members 16. Said opening 15 is adapted for bees to enter from one side of the frame 3 to another side of said frame 3 through said opening 15 in the base member 8.

Figure 7:
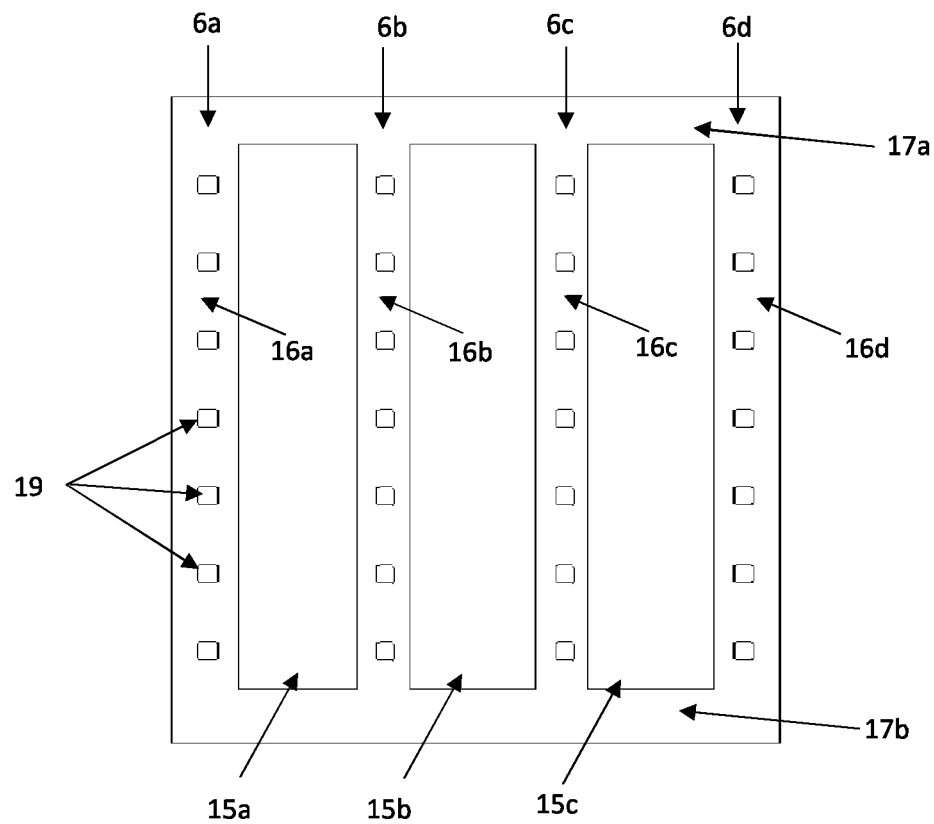
FIG. 7 shows the light unit.

FIG. 7 illustrates an embodiment of the invention wherein the light unit 6 comprises a base member 8 wherein the structural end members 17, 17a, 17b are on situated on the top and bottom parts of the base member 8, thus the structural end members being 17 horizontally aligned and wherein the longitudinal structural members 16, between the two end members 17, are vertically aligned. The base member is illustrated in FIG. 7 with three opening 15a, 15b and 15c, wherein said openings 15 has a larger extent in the vertical direction than they have in the horizontal direction, thus being vertically aligned. Said openings 15 must be at least the width of a frame 3 but no more the widths of the distance of two frames 3. Said opening(s) 15 being comprised of an open area void of material and being adapted for bees to enter from one side of a frame 3 to another side of the same frame 3 through said open area of the base member 8. Said open area or opening 15 may be a cut out section in an otherwise a solid plate that may make up the base member 8. In the figure the base member 8 comprises four vertically longitudinal structural members 16a, 16b, 16c, 16d, wherein longitudinal members are spaced apart a predetermined distance. The space between the two neighboring longitudinal members 16 forms the open area or the opening 15 adapted for bees to enter from one side of a frame 3 to another side of the same frame 3 through said open area of the base member 8. The columns of LED's are attached to the vertical longitudinal members 16 and. In FIG. 7, a first horizontal positioned end member 17a is connected to the first ends of the four vertical longitudinal structural members 16a, 16b, 16c, 16d and a second horizontal end member 17b is connected to the second ends of the four longitudinal structural members 16a, 16b, 16c, 16d.

The term structural end members 17 and longitudinal members 16 are used herein and are meant to be understood as members with an extent in an direction thus longitudinal, and structural as in they may be attach to each other, and/or the hive or parts thereof, and wherein the LEDs and/or parrs thereof may be attached thereto. The base member is thus structural in a way that it is a solid structure with a thickens less than W. The base member 8 and the longitudinal members and end members may comprise embedded wiring to electronically connect the columns of LED's and/or the LED's of the at least two columns. I an embodiment of the invention the base member and its parts thereof is a printed circuit board. The embedded wiring may be conductive tracks, pads and other features etched from one or more sheet layers of copper laminated onto and/or between sheet layers of a non-conductive substrate. The structural elements of the base member may be the comprised of sheet layers of a non-conductive substrate. The substrate may be comprised of glass epoxy or FR-4 galls or cotton paper impregnated with phenolic resin. In embodiments wherein the base member 8 is comprised of printed circuit board, the longitudinal structural members 16 and the end members 17 may be a homogeneous member with no visible joints or connects, and the openings 15 will be voids in this otherwise homogeneous member. The openings 15 may then be comprised of different shapes, like squares, slits, round, ovals, etc.

Figure 8:
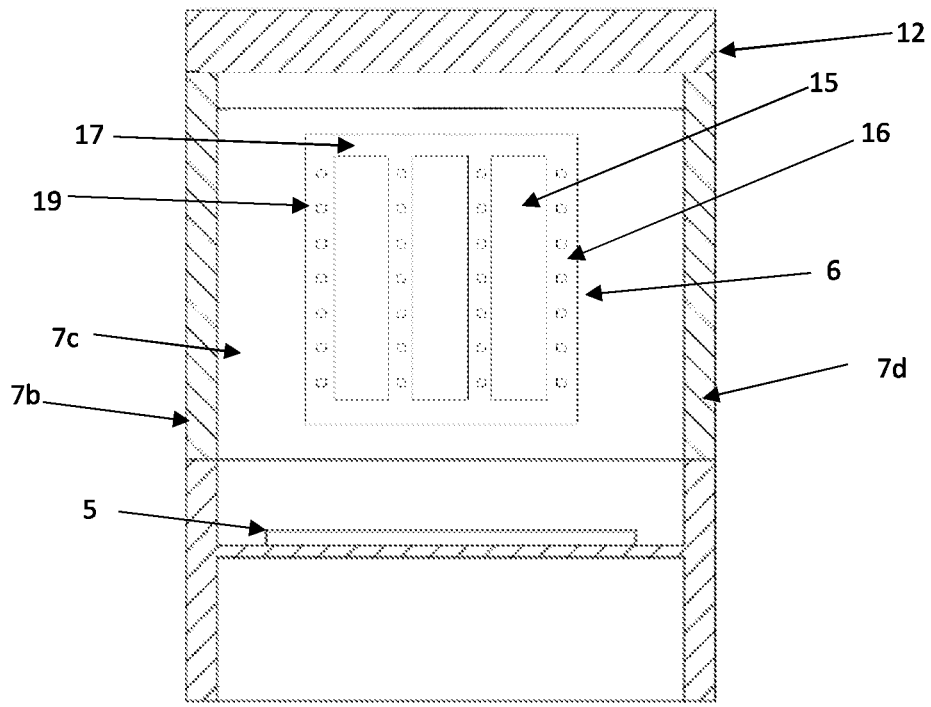
FIG. 8 shows the light unit attached to the internal of a hive.

FIG. 8 illustrated an embodiment of the invention wherein the light unit 6 as shown in FIG. 7 is located inside the hive compartment box 2. The structural end members 17 are on the top and bottom sections of the base member 8, thus the structural end members being 17 horizontally aligned and the longitudinal structural members 16a, 16b, 16c, 16d between the two end members 17, are vertically aligned. FIG. 8 the hive 1 is shown in a frontal view with the front wall 7a of the hive compartment box 2 removed to show a light unit 6 attached to the back wall 7c and with the vertical columns of LED's 19 facing the internal space of the hive compartment box 2. The light unit 6 when turned on, emits light with a predetermined wavelength on the inside of said hive compartment box, whereby the light unit 6 is positioned inside of the at least one hive compartment box 2. In FIG. 4 the frames 3 are not shown to illustrate the placement of the light unit 6.

Figure 9:
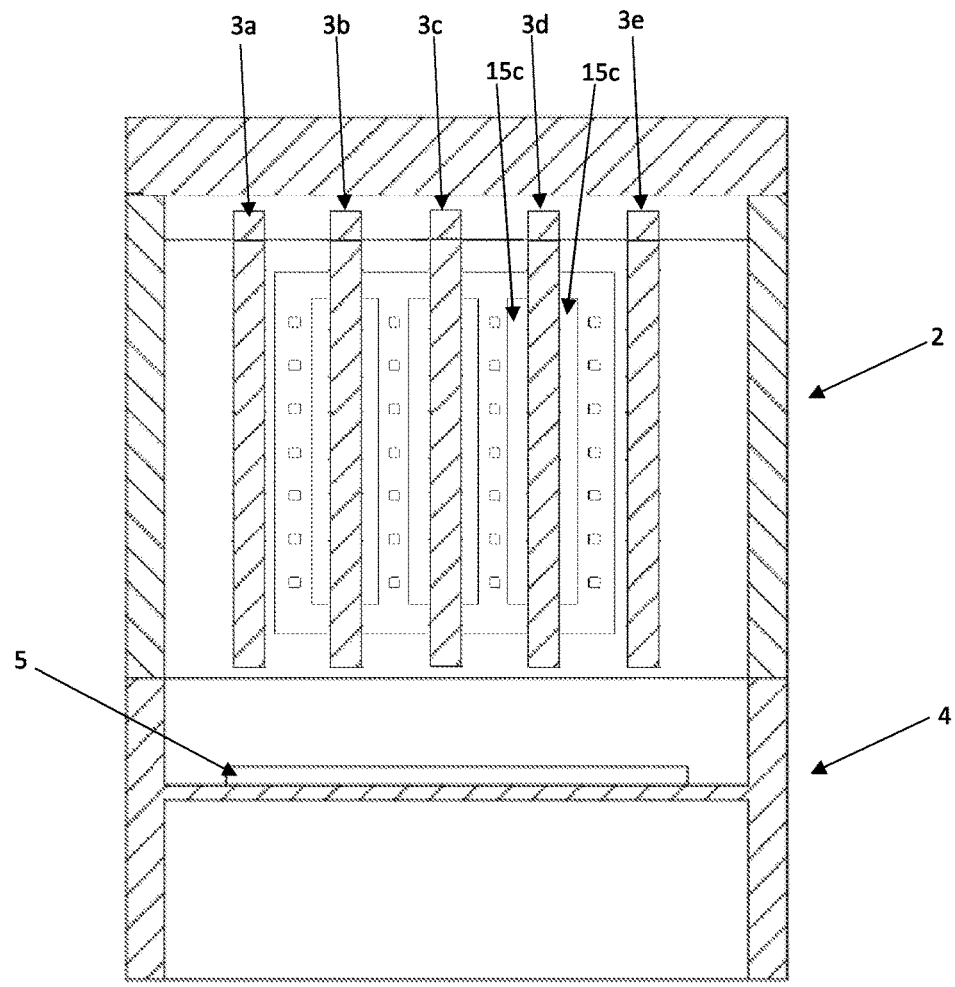
FIG. 9 shows the light unit attached to the internal of a hive with frames.

FIG. 9 illustrates a frontal section view of a hive with the front wall 7a of the hive compartment box 2 removed to show a light unit 6 attached to the back wall 7c and with five frames 3a, 3b, 3c, 3d and 3e hung inside the hive compartment box 2. The frames are hung from opposite protruding notches on each end of a frame 3 that corresponds with the opposing groves 11 on the front and back wall 7a, 7c of the hive compartment box 2. FIG. 9 illustrates the system in accordance with an embodiment of the invention for light treatment of pollinating insects, wherein the a hive structure 1 comprising at least one hive compartment box 2 comprising at least one frame 3 but more preferably multiple frames 3 spaced apart a predetermined distance inside the at least one hive compartment box 2. A common hive may comprise 11 or more frames, however, five frames are used in this illustration to case the view to the internals. An entrance chamber box 4 is positioned below the at least one hive compartment box 2 in contact with said hive compartment box 2. The entrance chamber box 4 comprises an entrance 5 for pollinating insects to enter and exit the hive structure. The entrance may be an opening or hole in the entrance chamber box 4. The at least one light unit, when turned on, emits light with a predetermined wavelength, wherein the predetermined wavelength is preferably between 620-1000 nm, and more preferably between 640-700 nm, and even more preferably between 660-680 nm. The one light unit 6 is positioned and fastened, either by releasable fastening means or permanents fastening men's, inside of the hive compartment box 2. The light unit 6 is comprising a base member 8, wherein said base member 8 is realizably fastened or fastened by fastening means to one of the side walls 7 of said hive compartment box 2 between the end of the frames and side wall 7. Said fastening means may be glue, adhesives or mechanical fasteners such as, screw, bolts, nails, hooks, latches or the like. The four vertical columns of LED's 6a-6d in FIG. 9 are attached to four vertically orientated longitudinal structural elements 16a-16d of the base member 8 on the side of the base member facing the open space and frames inside of the hive compartment box 2, said vertical columns of LED's 6a-6d are spaced apart a predetermined distance corresponding to the distance of two adjacent frames 3. The vertical columns of LED 6a-6e are situated and aligned between the frames 3a-3e, thereby each respective vertical columns of LED 6a-6e are facing the space between two adjacent frames 3 or the space between a frame and a wall 7, thereby illuminating, when turned on, the open space in front of the vertical columns of LED 6a-6e, the faces of the frames 3 and any bees that might be in the view of the light admitted.

In the embodiment illustrated in FIG. 9 the bees may traverse the hive compartment box 2 from one space between for instance frame a first frame 3a and a second frame 3b, to the space between the second frame 3b and a third frame 3c by the opening 15a between the first columns 6a and the second columns 6b of LED's.

Figure 10:
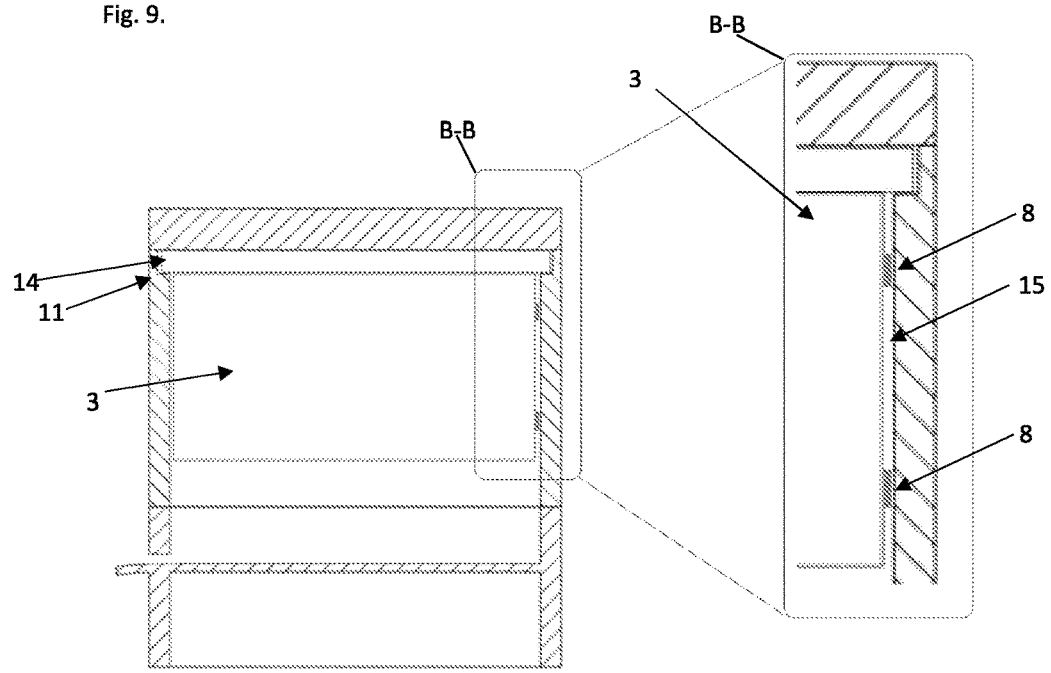
FIG. 10 shows the light unit attached to the internal of a hive with the openings enlarged.

FIG. 10 illustrates a cross-section straight thought a hive structure wherein the cross-section plane is a horizontal plane cutting through the front wall 7a with the entrance 5, the back wall 7c. The figure also shows a cross section of a frame 3 that is hung or suspended from opposite protruding frame notches 14 that rest in the opposing groves 11 of the respective opposing walls of hive structure 1 seen from the side, and an enlarged view of a section area B-B. For bees to move unhindered inside the chamber box 2 as disclosed above, when a light unit is attached to the wall between said wall and the end of said frame 3, the base member 8 of the light unit 6 comprises at least an opening 15. In FIG. 10 opening 15 is shown in accordance with the disclosure and accompanying text of the embodiment as shown in FIGS. 7-9. However, any embodiment of the invention as disclosed herein may comprise one or more openings. Said opening 15 is adapted for bees to enter from one side of the frame 3 to another side of said frame 3 through said opening 15 in the base member.

In FIG. 3, the illustration shows four LED's 19 constitute one vertical column of LED's, while in FIG. 7, the illustration shows that seven LED's constitute one vertical column of LED's. For the invention as disclosed herein a column of LED's is considered to be two or more LED's substantially vertically aligned. The LED's may be separate diodes, or they may be strips of diodes configured in a strip arrangement in or partly arranged in a transparent cover.

For a beekeeper to know where the bees in a beehive resides i.e. between which frames 3 and at what height the concentration of bees are located, the base member 8 may further comprises at least an infra read sensor 18 to map the location of the bee colony by way of heat mapping. The infrared sensors may be located at for each column of LED's. There may also be several infra read sensor stacked at different heights. The heatmapping may be used to determine where the bees are located. This information may be used so only the LED's where bees are located are activated, to preserve power if the supply is limited by way of battery of solar power or a combination thereof.

To control the device and the system disclosed herein the system may comprises a control unit for selectable switching the light therapy device on or off. The control unit for selectable switching the light therapy device on or off may be remotely configurable via a remote control and/or it may be locally controllable by a user. The control unit may be configurable to turn the turns the light on or off based on time of the day and/or night and/or time of the year. Furthermore, the control unit may determine to turn the light units 6 on or of based on several different parameter such as the light exposure duration, the duration of the off-time, the frequency of the intervals.

The at least one light unit 6 is powered by at least one battery and/or at least one external power source and/or at least one power generating device such as solar panels and/or wind power generators. The LED's of the at least one light unit 6 emit infrared or close to infrared light with a predetermined wavelength that is found to be most beneficial to heal and treat the insects inside the hive when the light is turned on. Said health beneficial predetermined wavelength is preferably between 620-1000 nm, and more preferably between 640-700 nm, and even more preferably between 660-680 nm. The system may further comprise a communication module to communicate, send and receive information to another location, either wirelessly or via wire.

Figure 11:
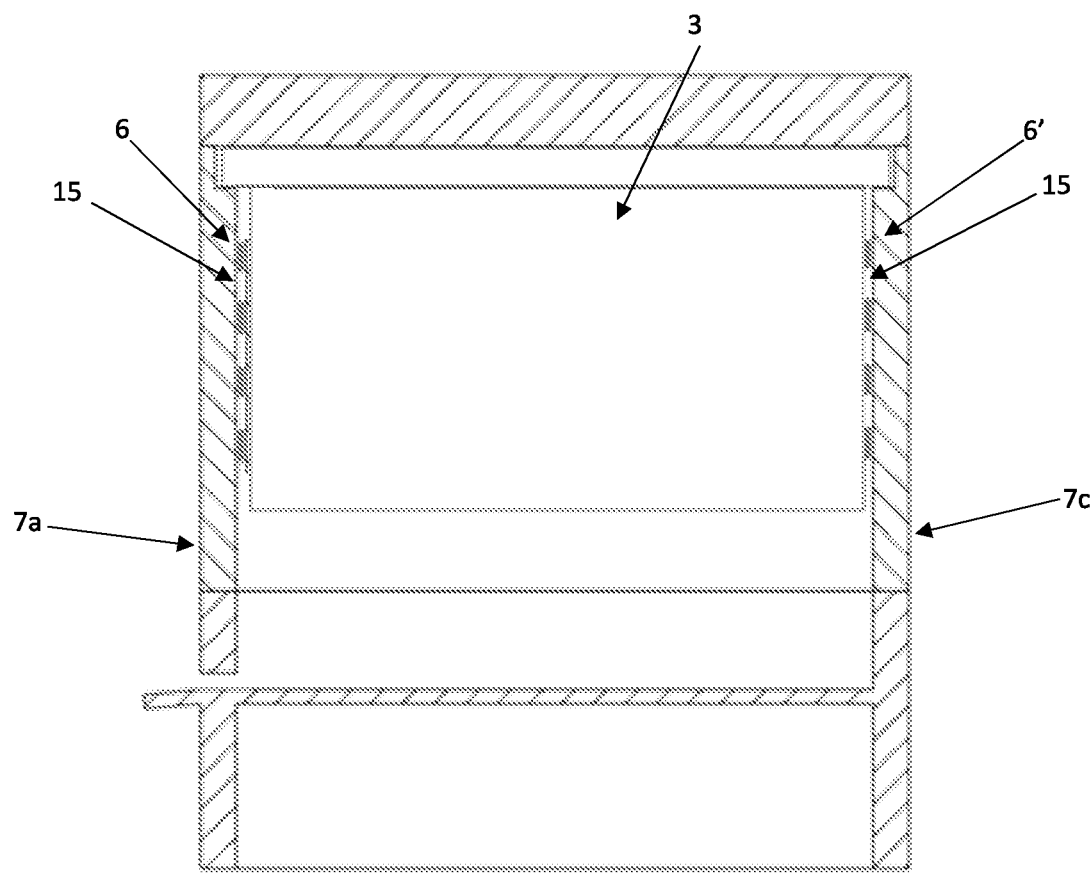
FIG. 11 shows a cross section of a hive where the device comprises two light units.

In FIG. 11 the light treatment device of the system comprises a further light unit 6'. Thus the system comprises a first and a second light unit 6, 6' wherein two light units are 6, 6' are respectively positioned on two opposing walls 7a, 7c and wherein the LED's where the columns of LED's are aligned in the space between at least two adjacent frames facing each other.

A hive may be comprised of several hive compartment boxes 2 stacked on top of each other and the light therapy device ant its light units 6 may be used in several of the stacked hive compartment boxes 2 in one hive.

In an alternative embodiment of the invention the light device 6 is fastened to the underside of a top cover 12 facing the top of the frames 3 in the hive compartment boxes 2 to illuminate the space between the frames 3 form the top. The openings 15 allows for pollinators to enter from on side of the light device 6 to another, if the top cover 12 comprises openings to the outside of the hive 1. The openings will allow pollinators to pass through the light device 6 through the opening 15. In a further alternative embodiment of the invention where the hive 1 comprises several compartment boxes 2 stacked on top of each other, the light device 6 may be fastened to the underside of the one of the stacked hive compartment boxes 2 facing the top of the frames 3 of the hive compartment box 2 below, i.e. between the frames 3 of the box 2 below and a part of the inside of the box 2 above, as to allow pollinators and bees to pass from a lower compartment box 2 to a higher compartment box 2, or vice versa, through the opening(s) 15 of the light device. In a further alternative embodiment of the invention where the hive 1 comprises several compartment boxes 2 stacked on top of each other, the light device 6 may be fastened to the bottom of the one of the stacked hive compartment boxes 2 facing the bottom of the frames 3 of the hive compartment box 2 above, i.e. between the frames 3 of the box 2 above and a part of the inside of the box 2 under, as to allow pollinators and bees to pass from a lower compartment box 2 to a higher compartment box 2, or vice versa, through the opening(s) 15 of the light device. To be able to fasten the light device 6 above or below the frames 3, the hive 1 may comprise an additional member fasten to or supported by one or more of the inside-facing walls of the hive. For instance, the additional member may be a retrofittable grid or plate comprising openings, to be placed above the frames 3 and supported either by the top part of the walls or the frames, wherein the openings 15 of the light device correspond with the openings of the additional member.

The system of the above illustrated examples may be used in a method in accordance with an embodiment of the invention to heal and treat against pesticide and other stressful or damaging elements, and to have a prophylactic effect on the bees. To treat and heal the bees in the wild or in places where beekeepers house and keep their bees must be exposed to the correct amount of light emitted from the light therapy device as comprised in the system in according to the inviting. The system must therefore be used as the bees habituating habitat. The predetermined interval for turning the at least one light unit 6 of the light therapy device on and off, must be decided on based on the time of the year, the pesticide situation from nearby fields and the time of the day. For instance if nearby fields or crops are spread with neonicotinoids or other pesticides, there would be a need to increase the longitude of exposure or the number of light units emitting the therapeutic light frequency of preferably between 620-1000 nm, and more preferably between 640-700 nm, and even more preferably between 660-680 nm. During the light exposure the bees would practice their daily routine of pollinating, harvesting food and producing honey, while the light therapy device comprised in the system would heal and treat the bees unobtrusively, not affecting the bees in any negative way. This means that the normal flow and transportation of bees, larva, brood and honey should not be affected by hinders or obstacles normally not found in bee hives. A beekeeper may utilize several systems according to the above-mentioned embodiments multiple hives and colonies, in order to achieve a collective healing and strengthening effect on entire colonies stretching over large areas.

Although specific embodiments of the invention have been described and illustrated herein, it is recognized that modifications and variations may readily occur to those skilled in the art, and consequently, it is intended that the claims be interpreted to cover such modifications and equivalents.

REFERENCE NUMERALS

1 The hive
2 Hive compartment box
3 Frames
3a-3k Frames
4 Entrance chamber box, bottom board
5 Entrance in the entrance chamber box
6, 6' Light unit
6a-6c Vertical columns of light emitting diodes, LED's
7 Walls of hive compartment box
7a-7d Walls of hive compartment box
8 Base member
9 Walls of the entrance chamber box
9a-9d Walls of the entrance chamber box
10 Landing board
11 Grooves adapted for receiving frame notch
12 Top module, top cover
13 Bottom floorboard in the bottom board
14 Frame notches
15 Opening(s) in base member
16 Longitudinal structural members
17 Structural end members
18 Infrared sensor(s)
19 LED's, lights

What is claimed is:

1. A system for light treatment of pollinating insects comprising:
a hive structure comprising a hive compartment box comprising a plurality of frames spaced apart inside the hive compartment box; and
a light unit, wherein the light unit, when turned on, emits light with a predetermined wavelength, wherein the light unit is positioned inside of the hive compartment box, wherein the light unit comprises:
a base member, said base member being attached to a side wall of said hive compartment box between one end of the plurality of frames and said side wall, two vertical columns of light emitting diodes (LEDs), said two vertical columns of LEDs are attached to said base member on a side of the base member facing an inside of the hive compartment box, said two vertical columns of LEDs being spaced apart a predetermined distance corresponding to a distance of at least two adjacent frames, or longer,
wherein the base member comprises an opening located between one frame of the plurality of frames and the inside of the hive compartment box where the base member is fastened, wherein the opening is an open area of the base member adapted for pollinating insects to enter from one side of the one frame to another side of the one frame past the base member.

2. The system in accordance with claim 1, wherein the base member comprises two longitudinal structural members, wherein the two longitudinal structural members are spaced apart a predetermined distance, and whereby a space between the two longitudinal structural members forms the opening adapted for pollinating insects to enter, and wherein the two vertical columns of LEDs are attached at least partly to the two longitudinal structural members.

3. The system in accordance with claim 2, wherein the base member comprises further longitudinal structural members wherein the further longitudinal structural members are parallel oriented in relation to each other, and wherein the further longitudinal structural members are spaced apart from one of the two longitudinal structural members, whereby a plurality of spaces between the further longitudinal structural members form a plurality of openings in the base member adapted for pollinating insects to enter, and wherein the two vertical columns of LEDs are attached at least partly to the two longitudinal structural members.

4. The system in accordance with claim 2, wherein the base member comprises a first structural end members, wherein the first structural end member is attached to a first end or a second end of the two longitudinal structural members to form a substantially grate or lamellar shaped base member.

5. The system in accordance with claim 4, wherein the base member comprises a further structural end member, wherein the further structural end member is attached to an opposite end of the two longitudinal structural members from the first structural end members to form another substantially grate or lamellar shaped base member.

6. The system in accordance with claim 1, wherein the two vertical columns of LEDs are each situated between adjacent frames of the plurality of frames, wherein a distance between the two vertical columns of LEDs corresponds to the distance of the at least two adjacent frames, thereby illuminating at least part of an open space on each side of a frame.

7. The system in accordance with claim 1, wherein the light unit is fastened to the hive compartment box by fastening means.

8. The system in accordance with claim 7, wherein the fastening means comprises releasable attachment means.

9. The system in accordance with claim 1, wherein the base member comprises embedded wiring to electronically connect said LEDs of the two vertical columns.

10. The system in accordance with claim 1, wherein the two vertical columns of LEDs comprise two or more LEDs substantially vertically aligned or strips of LEDs vertically orientated.

11. The system in accordance with claim 1, wherein the base member further comprises an infrared sensor adapted to map a location of the pollinating insects by way of heat mapping.

12. The system in accordance with claim 1, wherein the base member is fastened to the side wall of the hive compartment box partly between one frame of the plurality of frames and the side wall.

13. The system in accordance with claim 1, wherein the system further comprises an additional light unit, and wherein the light unit and the additional light unit are positioned on two opposing side walls, respectively, and wherein the two vertical columns are located in a space between at least two adjacent frames.

14. The system according to claim 1, wherein the system further comprises a control unit for selectable switching the light unit on or off.

15. The system according to claim 14 wherein the control unit for selectable switching the light unit on or off is remotely configurable via a remote control.

16. The system according to claim 14, wherein the control unit turns the light on and/or off based on a time of day and/or a time of year.

17. The system in according to claim 14, wherein the control unit is configurable to control parameters for predetermined light intervals, wherein said parameters include a light exposure duration, a duration of an off-time, or a frequency of the predetermined light intervals.

18. The system according to claim 1, wherein the light unit is powered by at least one battery and/or at least one external power source and/or at least one power generating device.

19. The system according to claim 1, wherein the pollinating insects are honeybees or bumblebees.

20. The system according to claim 1, wherein the predetermined wavelength is preferably between 620-1000 nm, and more preferably between 640-700 nm, and even more preferably between 660-680 nm.

21. A method for treatment of pollinating insects inside a hive by the system of claim 1, comprising:
housing the pollinating insects inside said hive;
selecting a predetermined interval for turning the light unit on and off; and
illuminating the pollinating insects for the predetermined interval with the light unit.

* * * * *